Jan. 3, 1928.
W. G. MILLER
1,654,745
COMBINED PRESSURE DOUCHE AND WATER CONTROLLER AND CHARGER
Filed Aug. 11, 1924
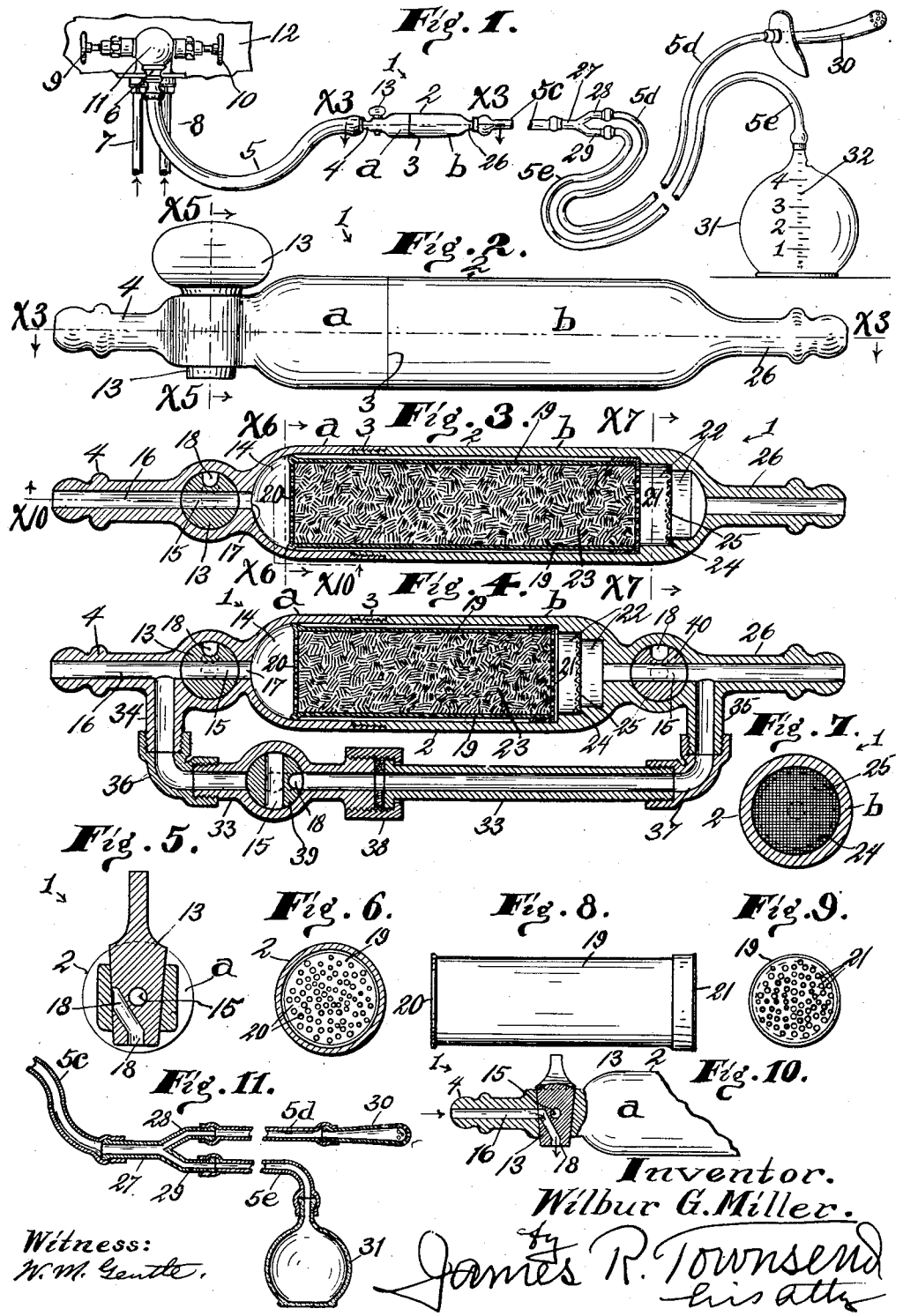
Witness:
W. M. Gentle.
Inventor.
Wilbur G. Miller.
by James R. Townsend
his atty Patented Jan. 3, 1928.

1,654,745

UNITED STATES PATENT OFFICE.

WILBUR G. MILLER, OF LOS ANGELES, CALIFORNIA.

COMBINED PRESSURE DOUCHE AND WATER CONTROLLER AND CHARGER.

Application filed August 11, 1924. Serial No. 731,379.

The invention relates to means for controlling the flow and temperature of water used for cleansing abdominal cavities and organs and other like purposes, with means in connection therewith for automatically charging the water with cleansing, disinfecting and healing materials such as are well known in the medical and surgical arts, together with the removal by said charged water under gravity or other pressure of any diseased portions, pus, excretions or other substances foreign or local.

An object of the invention is to provide a simple and effective water controller having a valve that can first be adjusted to by-pass a flow of water under pressure from a coupling to the outer air so that is can be tested as to its temperature by an operator while cocks for controlling hot and cold water are being adjusted to give a flow of water of the right volume and temperature; after which the valve can be operated to pass the flow of water directly through the controller to be charged with a cleansing, disinfecting or healing material, and thence to be discharged through a douche nozzle or other proper appliance.

An object of the invention is to provide a water controller and charger whereby the supply of hot and cold water may be mixed to a proper temperature and volume to be used in the douche or cleansing appliance.

An object of the invention is to provide a water controller and charger that is adapted for use with appliances for internal cleansing of abdominal organs and cavities in which use it is essential to maintain the flow of water at the right volume and temperature.

Another object of the invention is to provide a water controller that is adapted for use with surgical appliances in cleansing abscesses in which use it is essential to use a disinfectant with the water so as to eliminate or prevent infectious diseases.

Another object of the invention is to provide a water control with a simple means in connection therewith for approximately determining the amount of water injected into a cavity.

Features of the invention are shown in the construction, combination and arrangement of the parts, whereby a water controller and charger is provided that is neat and pleasing in appearance, durable in construction and effective in action.

An object is to provide practical means for employing domestic water service at any desired pressure and temperature from a combined hot and cold water bath tub faucet for the purpose of applying a vaginal douche as a part of a bath in order to insure internal as well as external cleansing.

Another object is to provide a douche having a douche nozzle that is connected to a hot and cold water supply by a flexible hose coupling that is of sufficient strength to hold back water under pressure when a valve in the coupling is shut off so that the water pressure is applied to the coupling.

An object of the invention is to provide a practical and simple device whereby one may be able to use a douche of desired temperature from a bath tub hot and cold water faucet, and to do this in such a manner that the water may be tested before passing through a medicament containing chamber; so that the medicament will not be subject to be dissolved and carried through the apliance until the person using the douche has been able to bring the water to the desired temperature by manipulating the hot and cold water valves.

Other objects, advantages and features of invention may appear from the accompanying drawing, the subjoined detail description and the appended claims.

The accompanying drawing illustrates the invention.

Figure 1 is a fragmental view of a toilet fixture having a hot and cold water supply connected thereto, and showing a douche that is constructed in accordance with this invention.

Fig. 2 is an enlarged side view of the controller and charger detached from the clyster pipe.

Fig. 3 is a section on line $x^3$, Figs. 1, 2, showing the valve in position to pass the flow of water through the controller and medicament container.

Fig. 4 is a section analogous to Fig. 3, showing means for by-passing clear water around the charger barrel.

Fig. 5 is a cross section on line $x^5$, Fig. 2.

Fig. 6 is a cross section on line $x^6$, Fig. 3, showing a perforated end of a medicament container in the charger barrel.

Fig. 7 is a cross section on line $x^7$, Fig. 3.

Fig. 8 is a side view of a medicament container detached from the charger barrel.

Fig. 9 is an end view of a medicament container showing the other perforated end thereof.

Fig. 10 is a fragmental section on staggered line $x^{10}$, Fig. 3, showing the valve in position to by-pass the flow of water from the coupling pipe to the outer air.

Fig. 11 is a fragmental sectional view through the clyster pipe, distributor, gauge and syringe used in connection with the water controller and charger.

The douche valved hose connection 1 is provided with a water controller and charger comprising a barrel 2 formed of pieces $a$ and $b$, that have their adjacent ends connected together by a screw joint 3.

The piece $a$ is provided with a nipple 4 that is adapted to be inserted into one end of a strong coupling or clyster pipe 5, that has its other end connected to a faucet 6 that receives its supply of water from the hot and cold water pipes 7, 8 that are controlled by cocks 9, 10 in a union fixture 11 which may be attached to a lavatory or bath tub 12, fragmentally shown in Fig. 1; and pipe 5 is of sufficient strength to stand a high pressure of water without breaking.

A two-way valve plug 13 is interposed between the nipple 4 and the chamber 14 of the barrel 2, and this valve is constructed at the receiving end of the connection so that when the valve plug is turned to the position shown in Figs. 1, 2, 3, 4 and 5, the cross passage 15 will be in register with a passage 16 through the nipple 4 and this passage enters the chamber 14 at 17, and when the valve 13 is in the position shown in Fig. 10, the by-pass passage 18 will be in register with the passage 16 so that water will flow through the nipple 4 and discharge into the outer air as indicated by arrows in Fig. 10, so that as the water thus discharges, its temperature can be tested by an operator's hand or accurately determined by a thermometer inserted in the discharging water.

While the water is discharging through the passage 18 into the outer air, an operator can adjust the cocks 9 and 10 to give the right flow of hot and cold water to obtain a mixture at the right temperature; after which the valve 13 can be actuated to cut off the passage 18 and move the passage 15 into register with the passage 16 so that the water will then flow into the chamber 14 of the barrel 2.

I have thus provided a novel douche hose or tube connection having two nipples and having a valve barrel 2 between such nipples, and have provided a two-way valve plug 13 in said valve barrel; the first way of said plug as at 18 being adapted and arranged to be open to the bore 16 of the receiving nipple and to the open air, to allow liquid to flow from the hot and cold water union fixture 11 to the open air while the passage 15 in said valve for delivering water to the second nipple 26 is closed.

By this arrangement I have provided a light and convenient douche hose connection by which one desiring to take a douche may test the temperature of the water with one hand, while manipulating the hot and cold water union faucets with the other hand, and when the water is of the desired temperature, may apply the douche nozzle to douche delivering position with one hand, and may, with the other hand, turn the valve plug to deliver the douche. It is possible by this novel construction and arrangement to provide a very light and simple arrangement by which a douche of the desired temperature may be applied without an attendant and may be shut off without straining the hose leading to the connection.

A container 19 having foraminous ends 20, 21 is arranged in the barrel 2 so that water entering the chamber 14 will pass through the container into a chamber 22 of the barrel 2, and as the water passes through the container it will absorb a portion of disinfecting material, or medicament 23 that may be placed therein.

It is understood, however, that the controller can be used either with or without the container 19.

The wall of the chamber 22 is provided with an intermediate shoulder 24 against which is arranged a fine wire screen 25 that is adapted to prevent undissolved particles of the material from the container 19 from passing out of the chamber 22.

A discharge nipple 26, integral with the part $b$ of barrel 2 is adapted to be connected to an intermediate coupling or clyster pipe $5^c$, which has its other end connected to a water distributor 27, see Figs. 1 and 11.

The distributor 27 is provided with two nozzles 28, 29 having discharge openings of substantially the same size, so that water entering the distributor will be separated into two equal volumes, one volume flowing through a pipe connection $5^d$ to the douche nozzle 30, and the other volume passing through a gauge pipe $5^e$ to the transparent receptacle 31 that is provided with a water gauge 32, that has an air vent.

By the foregoing construction and arrangement of parts the quantity of water discharging from the douche nozzle 30 can be easily determined by the quantity discharging into the transparent receptacle; and the temperature and flow of water can be determined as previously described.

If desired the water controller and charger 1 can be provided with a by-pass pipe 33 as shown in Fig. 4.

Threaded extensions 34, 35 integral and arranged at right angles to the nipples 4, 26 are provided with elbows 36, 37 connected to the pipe 33, and a pipe coupling 38, and valve 39 are arranged in the pipe 33.

A valve 40 is arranged adjacent the end of part $b$ of the barrel 2 at a point intermediate of the chamber 22 and the extension 35 that is adapted to prevent a back flow of water into the chamber 22 when clear water is being by-passed through the pipe 33.

The construction and operation of the valves 39, 40 is substantially like that of the valve 13.

In use the temperature of the water is determined and it is then permitted to flow through the barrel 2 to the douche nozzle 30 as hereinbefore described; and when the controller and charger are constructed as shown in Fig. 4, clear water can be passed around the barrel 2 to clear a cavity of a disinfectant or medicament if it is so desired.

I claim.

1. The water controller and charger set forth comprising a barrel adapted to be interposed in a pipe; and a valve integrally formed with one end of said barrel, a by-pass pipe extending around said barrel, and a valve in said by-pass pipe.

2. The water controller and charger set forth comprising a barrel having inlet and outlet ends adapted to be interposed in a clyster pipe; a medicament container having perforated ends arranged in said barrel; a valve arranged adjacent the inlet end of said barrel and integral therewith, said valve having passages, one of which is adapted to flow water from the clyster pipe into said barrel and the other to by-pass water from the clyster pipe to the outer air.

3. The water controller and charger set forth comprising a barrel having inlet and outlet ends; a medicament container in said barrel that has perforated ends; a clyster pipe in which said barrel is interposed, said pipe connected to a supply of hot and cold water under pressure; a two-way valve adjacent the inlet end of said barrel that is adapted to open and close a passage into said barrel and also to by-pass water from said pipe to the outer air; a screen adjacent the outlet end of said barrel; a douche nozzle at the discharge end of said pipe; and a gauge connected to the outlet end of said barrel to determine the amount of water discharging from the douche.

4. The water controller and charger set forth comprising a barrel adapted to be interposed in a pipe, a valve integrally formed with one end of said barrel, said valve having a by-pass passage adapted to selectively discharge the flow to said barrel into the outer air, to determine the temperature of said flow, and said valve having another passage therethrough to direct the flow into the barrel, said first named and last named passages being adapted to be selectively registered with said pipe.

5. A douche appliance comprising two parts adapted to be fastened together to form a chamber, each of said parts being provided with a nipple onto which a douche tube may be tightly fitted, and one of said parts being provided between its nipple and the end adapted for attachment to the other part with a valve barrel; and a two-way valve plug in said valve barrel provided with ways one of which is adapted at one position of the valve plug to communicate between the nipple and the chamber, and the other of which ways is adapted, at another position of the plug, to communicate between said nipple and the external air.

6. A tube connection comprising a receiving nipple and a discharge nipple, a valve barrel between said nipple, and a two-way valve plug in said valve barrel, adapted when in one position to open the way to the receiving nipple and to close the way between the two nipples, and when in another position, to open the way between the two nipples and close the way between the receiving nipple and the external air for the purpose of first testing the temperature of water flowing through the first nipple, and then allowing water to flow through the discharge nipple.

In testimony whereof, I have hereunto set my hand at Los Angeles, California, this 6th day of August, 1924.

WILBUR G. MILLER.